(12) United States Patent
Noldus

(10) Patent No.: US 11,463,485 B2
(45) Date of Patent: Oct. 4, 2022

(54) METHOD, SYSTEM AND ENTITY FOR A MEDIA TRANSFER SESSION IN AN IMS INFRASTRUCTURE

(71) Applicant: Telefonaktiebolaget LM Ericsson (publ), Stockholm (SE)

(72) Inventor: Rogier August Caspar Joseph Noldus, Goirle (NL)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 148 days.

(21) Appl. No.: 16/958,508

(22) PCT Filed: Dec. 29, 2017

(86) PCT No.: PCT/EP2017/084818
§ 371 (c)(1),
(2) Date: Jun. 26, 2020

(87) PCT Pub. No.: WO2019/129359
PCT Pub. Date: Jul. 4, 2019

(65) Prior Publication Data
US 2021/0058434 A1 Feb. 25, 2021

(51) Int. Cl.
*H04L 65/1016* (2022.01)
*H04L 65/1023* (2022.01)
(Continued)

(52) U.S. Cl.
CPC ...... *H04L 65/1016* (2013.01); *H04L 65/1026* (2013.01); *H04L 65/1036* (2013.01); *H04L 65/1069* (2013.01)

(58) Field of Classification Search
CPC ............. H04L 65/1016; H04L 65/1026; H04L 65/1036; H04L 65/1069
See application file for complete search history.

(56) References Cited

U.S. PATENT DOCUMENTS 9,432,414 B2    8/2016  Belling et al.
2003/0217165 A1*  11/2003  Buch ................. H04L 29/06027
                                                     709/229
(Continued)

FOREIGN PATENT DOCUMENTS

RU    2434363 C2    11/2011
RU    2446624 C2    3/2012
(Continued)

OTHER PUBLICATIONS

International Search Report and Written Opinion dated Aug. 31, 2018 for International Application No. PCT/EP2017/084818 filed on Dec. 29, 2017 consisting of 10-pages.
(Continued)

*Primary Examiner* — Khaled M Kassim
(74) *Attorney, Agent, or Firm* — Christopher & Weisberg, P.A.

(57) ABSTRACT

There is provided a mechanism for having an operator of an IP network that is applied for transferring the media transfer session stream for an IP Multimedia Subsystem, IMS, call to relate this stream to a specific operator of the home-network of the calling party User Equipment. By having, e.g., a Session Border Gateway, SBG, insert a specific signature, associated with the operator sourcing the media transfer session for the calling party UE, into the path carrying the media transfer session stream, the operator of the IP transport network is, by discovery of the specific signature, and its characteristics enabled to discover the operator sourcing the media transfer session.

14 Claims, 7 Drawing Sheets

(51) Int. Cl.
  *H04L 65/1033*   (2022.01)
  *H04L 65/1069*   (2022.01)

(56) References Cited

U.S. PATENT DOCUMENTS

| | | | | |
|---|---|---|---|---|
| 2006/0046758 | A1* | 3/2006 | Emami-Nouri | H04W 4/10 455/518 |
| 2007/0121622 | A1* | 5/2007 | Zhu | H04L 67/14 370/389 |
| 2008/0089344 | A1* | 4/2008 | Jansson | H04L 67/141 370/395.2 |
| 2009/0262915 | A1* | 10/2009 | Wu | H04M 3/02 379/207.16 |
| 2010/0002682 | A1* | 1/2010 | Shi | H04L 65/1043 370/352 |
| 2010/0185772 | A1* | 7/2010 | Wang | H04L 65/1069 709/227 |
| 2011/0131277 | A1* | 6/2011 | Niemoeller | H04M 15/00 709/204 |
| 2012/0163561 | A1* | 6/2012 | Zuo | H04W 4/90 379/46 |
| 2013/0212242 | A1* | 8/2013 | Mendiratta | H04L 65/1093 709/223 |
| 2014/0146954 | A1* | 5/2014 | Noldus | H04M 3/42008 379/114.01 |
| 2015/0019747 | A1* | 1/2015 | Baer | H04L 65/1006 709/228 |
| 2015/0063345 | A1* | 3/2015 | Hanstrom | H04L 65/1063 370/352 |
| 2016/0277274 | A1* | 9/2016 | Burman | H04L 43/0876 |
| 2017/0214534 | A1* | 7/2017 | Rivas Molina | H04L 65/105 |
| 2018/0077001 | A1* | 3/2018 | Noldus | H04L 29/06278 |
| 2018/0097851 | A1* | 4/2018 | Phadnis | H04L 65/1006 |
| 2018/0359283 | A1* | 12/2018 | Lukac | H04L 65/1073 |
| 2019/0364101 | A1* | 11/2019 | Ramakrishnan | H04L 65/1083 |

FOREIGN PATENT DOCUMENTS

| | | |
|---|---|---|
| RU | 2526718 C2 | 8/2014 |
| RU | 2577333 C2 | 3/2016 |
| WO | 2014139563 A1 | 9/2014 |

OTHER PUBLICATIONS

"Interconnected Mobile AII-IP Communications and the benefits for Operators, GSMA, Network 2020 Programme", Published 2015, consisting of 53-pages.
Russian Search Report and English Translation dated Jan. 12, 2021 for Application No. 2020121480, consisting of 5-pages.

* cited by examiner

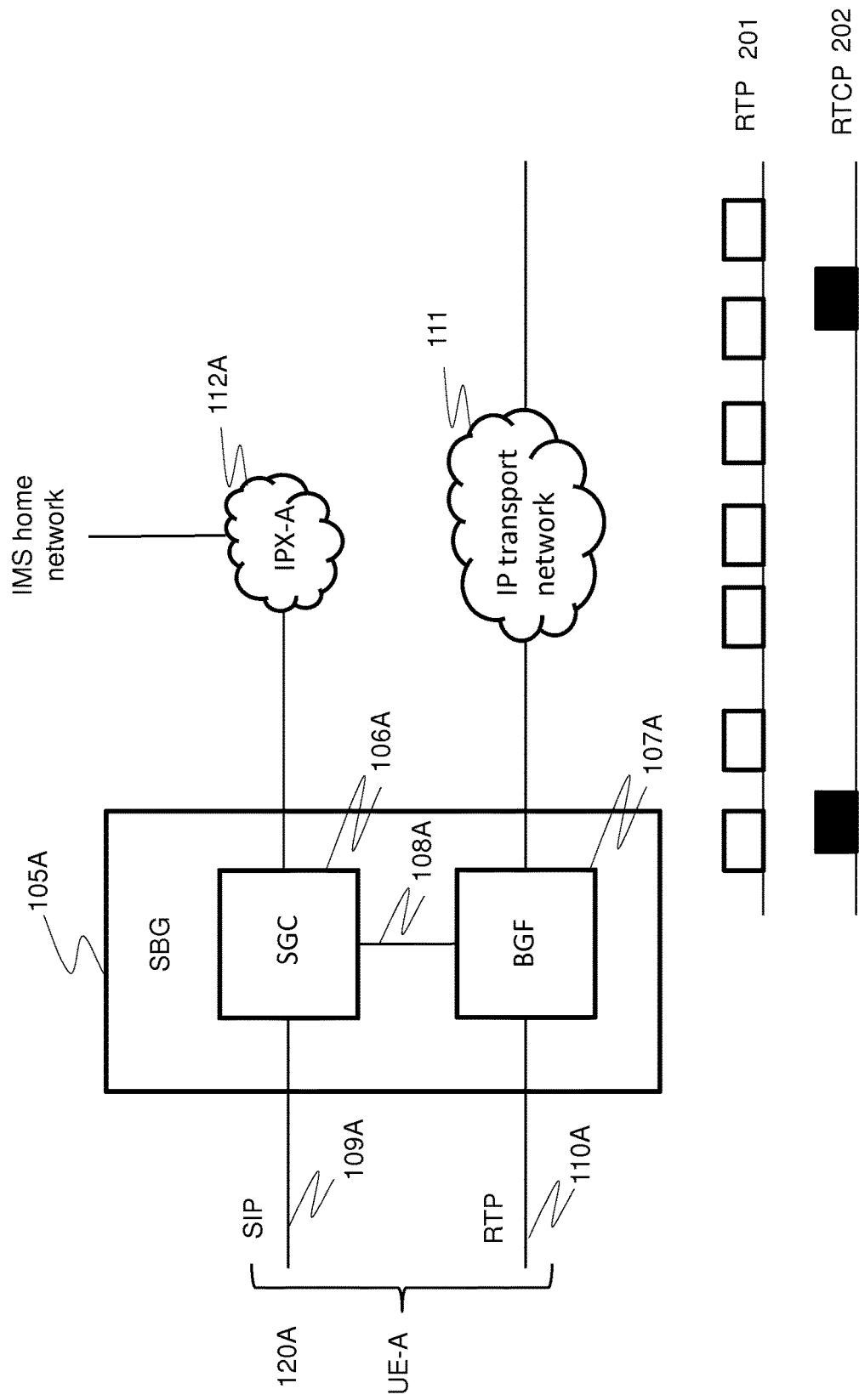

METHOD, SYSTEM AND ENTITY FOR A MEDIA TRANSFER SESSION IN AN IMS INFRASTRUCTURE

CROSS-REFERENCE TO RELATED APPLICATIONS

This application is a Submission Under 35 U.S.C. § 371 for U.S. National Stage Patent Application of International Application Number: PCT/EP2017/084818, filed Dec. 29, 2017 entitled "METHOD, SYSTEM AND ENTITY FOR A MEDIA TRANSFER SESSION IN AN IMS INFRASTRUCTURE," the entirety of which is incorporated herein by reference.

TECHNICAL FIELD

Embodiments presented relate to a method, system and entity for enabling associating a media transfer session with an operator sourcing the media transfer session in an Internet Protocol, IP, Multimedia Subsystem, IMS, infrastructure.

BACKGROUND

There are networks wherein a packets for controlling a call and packets carrying media data, belonging to a media transfer session, may be transported through separate and dedicated network infrastructures. In general it is desired that the media data packets of a communication session are routed according to a path having optimum transmission characteristics, tuned to low latency and high bandwidth, whilst for the path for controlling the call, latency and bandwidth are less critical and can be routed on a different path.

In an attempt to optimize the media transfer session transmission path, the 3rd Generation Partnership Project, 3GPP, Fourth Generation, 4G, and Fifth Generation, 5G, network architecture is continuously improved, e.g. to let the media transfer session "break out" at an early stage, close to the end-user terminal, or User equipment, UE. When considering for example a regular Voice over Long Term Evolution, VoLTE call, a Packet Data Network, PDN, Connection is established between a UE, and a PDN-Gateway PDN-Gw. Within the PDN Connection, multiple Evolved Packet System, EPS, bearers are established:

1. A so called "default" EPS bearer, is arranged for carrying the call control packets. This bearer is conceptually designated as the control plane. The Session Information Protocol, SIP, is a widely implemented example of a protocol applied at the default bearer, as applied in the Internet Protocol, IP, Multimedia Subsystem, IMS;
2. A so called "dedicated" EPS bearer, arranged for carrying the media transfer session, for a call comprising a voice component, this bearer is conceptually designated as the user plane. Real Time Protocol, RTP, and Real Time Control Protocol, RTCP, are examples of implementations of protocols applied at the user plane;
3. A further dedicated, but optional, EPS bearer is a bearer arranged for carrying the video component of the call, in the case of a video call, and also designated as a user plane. Also RTP and RTCP are protocols that can be used to support video.

The PDN-Gw is comprised by the Enhanced Packet Core, EPC. The EPC defines as the EPS without the Access network. The control plane and the user plane are both carried up to the PDN-Gw, through a single PDN Connection. From the PDN-Gw, the control plane and user plane are split:

1. The control plane signaling is routed towards a Session Border Gateway, SBG, function and is routed, from there, via a Session Gateway Controller, SGC, comprised by the SBG, through the IMS core network. The SBG resides at the edge of the IMS network;
2. The packets flowing in the user plane are routed towards a Border Gateway Function, BGF, also comprised by the SBG, residing at the edge of the IMS network. The BGF is controlled by the SGC.

There have been made attempts to optimize the user plane routing by locating the PDN-Gw and the BGF closer to the access network, i.e. closer to the eNodeB (for LTE access) or closer to a Wifi access network (for Wifi calling). The PDN-Gw and BGF may be combined or co-located to the eNodeB to reach an optimum path.

Combining the latter entities may become feasible when IMS and EPC are deployed as virtualized networks. The PDN-Gw (and other functional entities of the EPC) and the BGF are deployed as a Virtualized Network Function, VNF, also designated as virtual PDN-GW, vPDN-Gw and virtualized BGF, vBGF. So long as the vPDN-Gw and vBGF continue to have the specified reference points, for communication with other (virtualized) functional entities, this optimized placement of PDN-Gw and BGF don't alter the fundamental topology of the IMS network. In fact, an operator may continue to have a PDN-Gw in the EPC for generic internet access, and at the same time a logical PDN-Gw and a logical BGF co-located with, or in proximity to, the eNodeB, for IMS communication services.

When an IMS subscriber attaches to the EPC, a PDN Connection is established with an Access Point Name, APN, identifier, such as "inns" as to refer to the name of a PDN-Gw and to determine what type of network connection should be created.

A Mobility Management entity, MME, comprised by the EPC may for that PDN Connection select a (logical) PDN-Gw that is close to the location of the calling or called party UE. Likewise, when an IMS communication session is established from or to that calling or called party UE, the SBG may select a BGF for the user plane, that is close to the location of the subscriber. The desired result of selecting PDN-Gw and BGF close to the end-user is that the user plane may be routed efficiently, with minimal latency and minimal network resource usage.

When a communication session is established between two different network operators, the control signalling, such as the SIP signalling, between the two operators' networks is often carried through an Interconnect Network, also abbreviated as IPX. Conventionally both the user plane and the control plane are carried through the IPX network.

When the two operators are located in the same country and the calling party and called party involved in the call are not roaming, the control plane and the user plane, for this call between the two operators, may follow the same transmission path through IPX in a so called joint routing scenario.

Joint routing of control plane and user plane, for communication sessions that traverse an interconnect network, is stipulated by the Global System for Mobile communication Association, GSMA.

A issue is observed for roaming IMS users, with respect to the optimization of the routing of the user plane. The preferred method for IMS roaming, from a technical point of view, is known as Local BreakOut, LBO.

With LBO, a roaming IMS subscriber is attached to a visited (non-home network) EPS, with an APN="inns", such that the PDN Connection establishment is routed towards a PDN-Gw in that visited EPS. The visited PDN-Gw provides Local 3o BreakOut. The EPC in the visited network is functionally connected to an IMS network in that same visited network. The SIP control signaling from the roaming subscriber is routed towards a SBG in that visited IMS network. Likewise, the user plane is routed towards the same SBG in that visited EPC. A visited network may also be designated as "foreign" network.

According the paradigm of IMS, the control plane, with the SIP signalling, and user plane, with RTP signalling, can following different routes. The user plane can follow an optimized transmission path, whilst the control plane is routed towards the home-IMS entities of the served roaming subscriber.

A dilemma exists for optimizing the user plane routing for a roaming subscriber. As indicated, the control plane has to be routed towards the home IMS entities, such as a Serving Call State Control Function, S-CSCF of the served roaming subscriber.

The implementation of optimized routing of the user plane depends on the destination of the call. For example, when the call from the roaming subscriber is established towards a destination subscriber who is a subscriber of the visited IMS network (being his/her home network), then the optimized routing of the user plane would be through a local transmission network, e.g. towards a SBG that is selected by the IMS network of the destination subscriber in the visited IMS network. The effect is that the user plane is routed through a different network infrastructure than the control plane while:

1. In this case the control plane is routed from the visited IMS network to the home IMS network of the calling subscriber and then back towards the visited IMS network;
2. The user plane is routed internally in the local transmission network, situated in the visited network.

This situation is generally regarded as undesirable, as it has the effect that the visited IMS network is facilitating the control plane with its SIP transmissions without the RTP transmission being explicitly accompanied by its associated control plane. This situation might be considered as a "lack of control" over the user plane.

A similar situation occurs when a call that is established by a roaming calling 3o subscriber is destined for a subscriber in another country. An optimized user plane would then be routed:

1. The control plane is routed from the visited IMS network where the calling party resides, towards the home IMS network of the calling party, and from there towards the home network of the called party;
2. The user plane is routed from the visited IMS network of the calling party via a transmission network towards the home network of the called party.

There might be cases where optimized routing of the user plane is not preferred, e.g. when announcement needs to be played, when voice needs to be recorded or when other special handling of the user plane is required. However, in most call cases it may be expected that the user plane for a regular call does not require special handling, other than just be transmitted as efficiently and reliably as possible between calling party and called party.

Operators of transmission networks, that are routing the user plane, are in general not in favour of transferring a user plane that is unaccompanied by a corresponding control plane, since it may be ambiguous which operator is responsible for the call that that user plane belongs to, and that a media transfer session can't be associated with an end-user.

As to provide a solution to the problem of having an unaccompanied user plane with an associated accompanying control plane, a methodology is devised to force the control plane to be routed back towards the visited IMS network of the calling party and from there, route the control plane and user plane together as accompanying planes through the interconnect network towards the home network of the called party. This method is known as: Roaming Architecture for VoicE over IMS with Local breakout, RAVEL.

In general it seems to be a desire of operators to have the user plane accompanied by the control plane to enable control of the user plane, and at the same time to establish an efficient routing for the user plane when routing is performed trough an IMS network or interconnect network.

SUMMARY

It is an object of the embodiments presented to provide a method, system and entity to enable associating a media transfer session with an operator sourcing the media transfer session in an Internet Protocol, IP, transport network.

In a first aspect of the solution a method is proposed acting in an Internet Protocol, IP, Multimedia Subsystem, IMS, infrastructure where the task is to enable associating a media transfer session with an operator that sources, supports or facilitates the media transfer session. The infrastructure comprises, a calling party User Equipment, UE, a called party UE, a first path arranged, being the IP transport network. The IP transport network is configured to transport the media transfer session between the calling party UE and the called party UE via a gateway function which can be a Session Border Gateway, operating in an IP Multimedia Subsystem, IMS infrastructure.

At the initialization or during the media transfer session an IMS entity, such as a Multi Media Telephony application server, MMTel-AS, retrieves subscriber information from a subscriber database, such as the Home Subscriber Server, HSS, associated with the calling party UE. The method is executed according to a number of steps:

- as a step the IMS entity, such as the MMTel—As provides the gateway function, such as the SBG, with an identifier that is associated with a call session of the calling party UE. This identifier is identifying whether an insertion of a session signature in the media transfer session has to occur, and comprises a.o. information on the session of calling party UE. The receiving of the identifier in the SBG can be performed by an Session Gateway Controller, SGC, entity comprised by the logical SBG.
- as a further step the gateway function, such as the SBG uses the identifier for composing a session signature. The composition of a session signature can either be performed by the SGC or an Border gateway Function, BGF, entity.
- as a still further step the gateway function such as the SBG, inserts the composed session signature in the media transfer session in the first path, such as the IP transport network.

By means of this method an evaluation of the session signature enables an operator of the possibility to associate the media transfer session with the operator sourcing the media transfer session.

In a second aspect of the solution, a method in a gateway function is proposed, wherein the gateway function resides in an Internet Protocol, IP, Multimedia Subsystem, IMS, infrastructure. The method enables associating a media transfer session with an operator sourcing the media transfer session.

The infrastructure comprises, a calling party User Equipment, UE, a called party UE, a first path arranged, being the IP transport network. The IP transport network is configured to transport the media transfer session between the calling party UE and the called party UE via a gateway function which can be a Session Border Gateway, operating in an IP Multimedia Subsystem, IMS infrastructure.

- as a step the gateway function, such as the SBG, receives an identifier that is associated with a call session of the calling party UE, from an IMS entity, such as the MMTel-AS. This identifier is identifying whether an insertion of a session signature in the media transfer session has to occur, and comprises a.o. information on the session of calling party UE. The receiving of the identifier in the SBG can be performed by an Session Gateway Controller, SGC, entity comprised by the logical SBG.
- as a further step the gateway function, such as the SBG uses the identifier for composing a session signature. The composition of a session signature can either be performed by the SGC or an Border gateway Function, BGF, entity.
- as a still further step the gateway function such as the SBG, inserts the composed session signature in the media transfer session in the first path, such as the IP transport network.

By means of this method in the gateway function an evaluation of the session signature enables an operator of the possibility to associate the media transfer session with the operator sourcing the media transfer session.

As a third aspect, of the solution, a gateway function, such as an SBG, is proposed, wherein the gateway function is comprised by an Internet Protocol, IP, Multimedia Subsystem, IMS, infrastructure. The method enables associating a media transfer session with an operator sourcing the media transfer session.

The infrastructure further comprises, a calling party User Equipment, UE, a called party UE, a first path arranged, being the IP transport network. The IP transport network is configured to transport the media transfer session between the calling party UE and the called party UE via a gateway function which can be a Session Border Gateway, operating in an IP Multimedia Subsystem, IMS infrastructure. the gateway function comprises a processing unit, that is configured to cause the gateway function to:

receive an identifier that is associated with a call session of the calling party UE, from an IMS entity, such as the MMTel-AS. This identifier is identifying whether an insertion of a session signature in the media transfer session has to occur, and comprises a.o. information on the session of calling party UE. The receiving of the identifier in the SBG can be performed by an Session Gateway Controller, SGC, entity comprised by the logical SBG.
  use or process the identifier for composing a session signature. The composition of a session signature can either be performed by the SGC or an Border gateway Function, BGF, entity.
  insert the composed session signature in the media transfer session in the first path, such as the IP transport network.

By means of this gateway function capabilities an evaluation of the session signature enables an operator of the possibility to associate the media transfer session with the operator sourcing the media transfer session.

As a fourth aspect, of the solution, a computer program is proposed, wherein the computer program is executed on a gateway function. The gateway function, such as a SBG, is comprised by an Internet Protocol, IP, Multimedia Subsystem, IMS, infrastructure. The method enables associating a media transfer session with an operator sourcing the media transfer session.

The infrastructure, where the gateway function resides, further comprises, a calling party User Equipment, UE, a called party UE, a first path arranged, being the IP transport network. The IP transport network is configured to transport the media transfer session between the calling party UE and the called party UE via a gateway function which can be a Session Border Gateway, operating in an IP Multimedia Subsystem, IMS infrastructure. the gateway function comprises a processing unit, that is configured to cause the gateway function to:

The computer program has a computer code which, when run on processing circuitry of a the gateway function causes the gateway function to:
    receive an identifier that is associated with a call session of the calling party UE, from an IMS entity, such as the MMTel-AS. This identifier is identifying whether an insertion of a session signature in the media transfer session has to occur, and comprises a.o. information on the session of calling party UE. The receiving of the identifier in the SBG can be performed by an Session Gateway Controller, SGC, entity comprised by the logical SBG.
    use or process the identifier for composing a session signature. The composition of a session signature can either be performed by the SGC or an Border gateway Function, BGF, entity.
    insert the composed session signature in the media transfer session in the first path, such as the IP transport network.

By means of the execution of the computer program in the gateway function, an evaluation of the session signature enables an operator of the possibility to associate the media transfer session with the operator sourcing the media transfer session.

As a fifth aspect, of the solution, a gateway function, such as an SBG, is proposed, wherein the gateway function is comprised by an Internet Protocol, IP, Multimedia Subsystem, IMS, infrastructure. The method enables associating a media transfer session with an operator sourcing the media transfer session.

The infrastructure further comprises, a calling party User Equipment, UE, a called party UE, a first path arranged, being the IP transport network. The IP transport network is configured to transport the media transfer session between the calling party UE and the called party UE via a gateway function which can be a Session Border Gateway, operating in an IP Multimedia Subsystem, IMS infrastructure. the gateway function comprises a processing unit, that is configured to cause the gateway function to:

a receiver module for receiving an identifier that is associated with a call session of the calling party UE, from an IMS entity, such as the MMTel-AS. This identifier is identifying whether an insertion of a session signature in the media transfer session has to occur, and comprises a.o. information on the session of calling party UE. The receiving of the identifier in the SBG can be performed by an Session Gateway Controller, SGC, entity comprised by the logical SBG.

a processing module for composing or processing the session signature, based on the identifier received. The composition of a session signature can either be performed by the SGC or an Border gateway Function, BGF, entity.

an insertion module for inserting the composed session signature in the media transfer session in the first path, such as the IP transport network.

By means of these gateway function modules an evaluation of the session signature enables an operator of the possibility to associate the media transfer session with the operator sourcing the media transfer session.

BRIEF DESCRIPTION OF THE DRAWINGS

The inventive concept is now described by way of example, with reference to the drawings listed;

FIG. 2 is schematically detailing a part of the system of FIG. 1;

DETAILED DESCRIPTION

The inventive concept will be described with reference to the figures illustrating embodiments, listed above. The embodiments are not to be construed as limiting the inventive concept.

Figure 1:
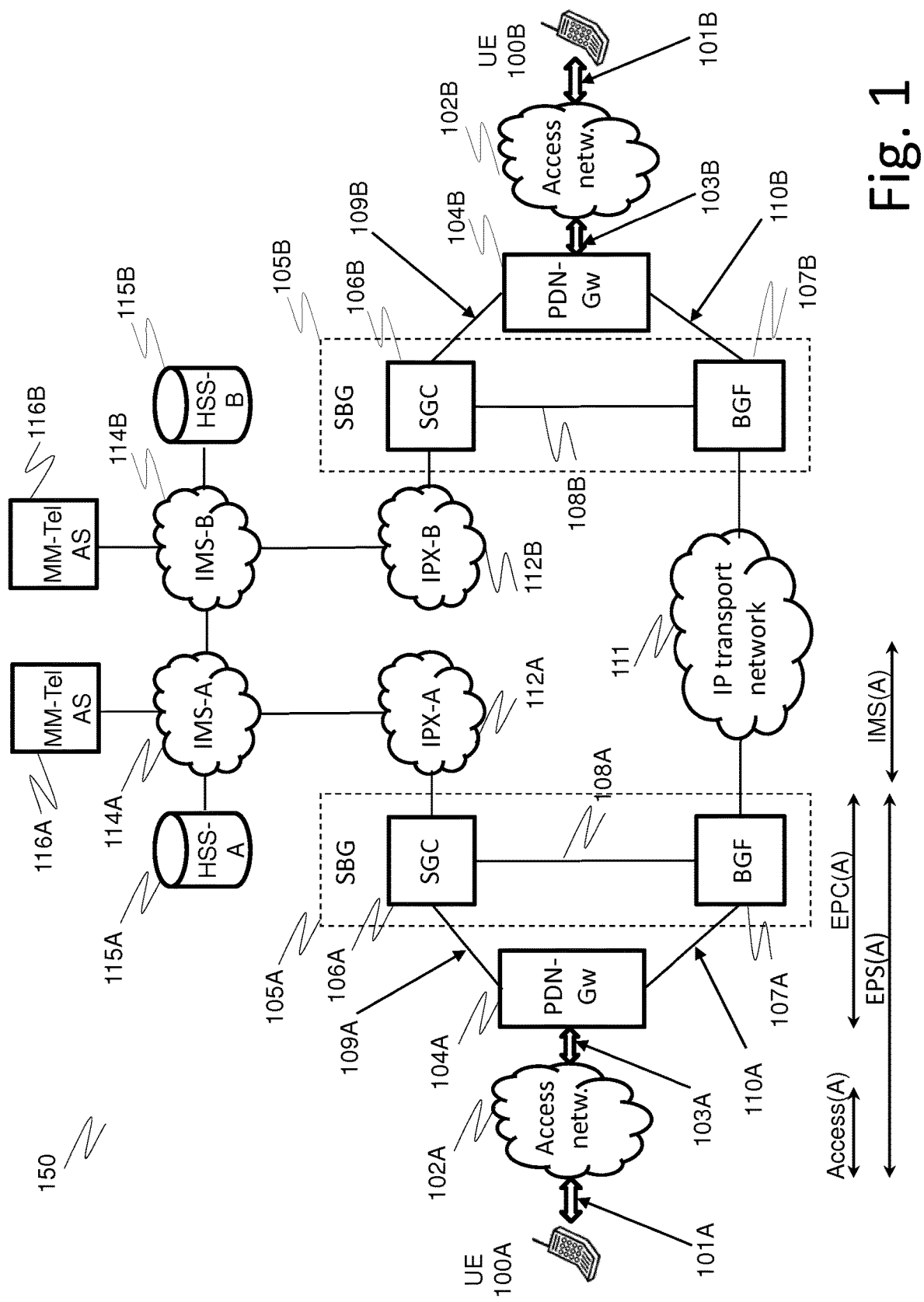
FIG. 1 is schematically illustrating a system wherein is method is to be applied.

FIG. 1 is schematically illustrating a communication system 150 wherein is method is to be applied. Generally are shown an access network, an Enhanced Packet Core, EPC, network and an Internet Protocol, IP, Multimedia Subsystem, IMS network infrastructure.

FIG. 1 illustrates a situation wherein a calling party User Equipment, UE, 100A, has a media transfer session with a called party UE 100B via an IMS network, wherein a control plane is routed differently from a media transfer plane, wherein both UEs are roaming. The calling party UE is 100A is connected via an access link 101A to an access network 102A, such as an Long Term Evolution, LTE, access network. The access network 102A is connected with a connection 103A to a Packet Data Network, PDN-Gateway, PDN-Gw 104A.

The PDN-Gw 104A has a dual connection to a Session Border Gateway, SBG 105A. The SBG 105A is connected to the PDN-Gw 104A via a link 109A for carrying the control plane, generally transferring Session Initiation Protocol, SIP, messages. The SBG 105A is as well connected to the PDN-Gw 104A via a link 110A for carrying a media transfer session, representing the user plane, generally transferring Real Time Protocol, RTP, messages. RTP is defined in Request For Comments, RFC, 3550 by the Internet Engineering TaskForce, IETF.

The SBG 105A comprises a Session Gateway Controller, SGC, 106A, and a Border Gateway Function, BGF, 107A.

the SGC 106A is adapted to support the control plane, and to control the BGF 107A via a link 108A.

Although the entities SBG, SGC and BGF are depicted as entities, these entities might be implemented as hardware, software or a combination of both. Solutions e.g. in a cloud execution environment, is an implementation example. The SBG 105A might comprises a number of SGCs 106A and BGFs 107A, where in general the SGC 106A is adapted to select the BGF 107A which is the most appropriate one in relation to the location of the calling party UE 100A. Where in this explanation or claims the SBG (105A) receives, transmits, processes, stores or retrieves user plane or control plane information, it is to be understood that the respective BGF 107A or SGC 106A perform these actions.

The SGC 106A is also connected to an interconnect network, also known as IPX network, IPX-A, 112A, arranged to transfer messages over the control plane. The IPX-A network is connected to an IMS network IMS-A, 114A, which has connections to a Subscriber database entity, Home Subscriber System, HSS-A 115A, and a Multi Media telephony Application Server, MMTel-AS 116A.

As illustrated the control path is routed from calling party UE 100A towards IMS-network, IMS-A 114A. From IMS-A 114A there is a control plane link towards the IMS network of the called party UE 100B. IMS-A 114A is communicatively connected to IMS-B 114B, the Home network of the called party UE 100B.

Regarding the media transfer session, the BGF 107A is connected to an IP transport network 111 which routes the media transfer plane into the direction of the BGF 107B, associated with the called party UE 100B. The transport network is among others arranged to transport RTP messages.

FIG. 1 illustrates an entire network infrastructure 150 where the called side with called party UE 110B, is illustrated as a conceptual mirror of the network infrastructure of calling party UE 110A. The descriptions of entities of the called side link 101B, access network 102B, connection 103B, PDN-Gw 104B, SBG 105B, SGC 106B, BGF 107B, link 108B, link 109B, link 101B, IPX network 112B, IMS network 114B, Subscriber database entity HSS-B 115B, MMTel-AS 116B, do correspond to the description of the respective entities calling side 101A, 102A, 103A, 104A, 105A, 106A, 107A, 108A, 109A, 1010A, 112A, 114A, 115A and 116A.

As indicated in the background section, a situation wherein IPX networks 112A, 112B are deployed, in the prior art the control plane was jointly routed with 3o the media transfer plane. FIG. 1 indicates a situation wherein the control plane is not routed with the media transfer plane, which is routed in a separate IP transport network 111. Although FIG. 1 indicates non-jointly routing of control- and media transfer planes, the solution presented can also be applied in jointly routed control- and media transfer plane implementations.

FIG. 2 is schematically detailing a part of the system of FIG. 1, wherein the method to be deployed is explained. The SBG 105A comprises SGC 106A and BGF 107A. SGC106A controls the BGF 107A via link 108A, deploying e.g. a Gateway Control Protocol H.248, as defined by the International telecommunication Union, ITU.

The control plane is communicating with calling party UE 100A via link 109A with the SGC 106A. The control plane is also communicating with the IMS network 114A via the IPX network IPX-A 112A, carrying a SIP session comprising Session Description Protocol, SDP, messages. The user plane is communicating with the calling party UE 100A via link 110A, and communicating via the BGF 107A towards the IP transport network 111.

Schematically the packets, comprising the data, send over the user plane via the BGF 107A are depicted in a time diagram 201, as RTP packets. Additionally, Real Time Control Protocol, RTCP, packets depicted in a time diagram 202 are transferred in the user plane that are provided by the BGF 107A, and transferred into the direction of the called party UE 101B. RTCP packets are applied for a.o. feedback, synchronization, control of the user interface, communication on delay, jitter and congestion on the communication link. RTCP does not transfer media transfer session packets as provided by RTP.

RTCP is defined Request For Comments, RFC, 3550 defined by the Internet Engineering TaskForce, IETF. As an alternative, a more secure version of RTCP, like Secure Real-time Transport Protocol, SRTP, and its control protocol secure RTCP, SRTCP can optionally be deployed, enabling flow encryption and/or authentication, such as defined RFC 3711.

The term "RTP stream" generally refers to the combination of an RTP message transfer and the associated RTCP message transfer. RTP messages and RTCP messages are by design transferred to the same IP address (and originate 3o from the same IP address), but use different port number for origin IP address and destination IP address.

For a person-to-person media transfer session, there are generally two RTP media transfer session streams simultaneously applied, one in each direction. At each end, the IP address & port from which RTP/RTCP is sent, is also the IP address & port at which RTP/RTCP is received.

When the roaming calling party UE 100A calls called party UE 100B, a SIP session is established from the calling party UE 100A towards called party UE 100B. According to the solution, the SIP session establishment procedure is enhanced with the following aspect: the SIP message sent towards the calling party, carrying an SDP answer that is used for the media transfer session establishment, contains also an instruction to reflect the SIP session in the user plane.

The SGC 106A serving the calling party UE 100A will, as per prior art, forward the SDP answer towards the BGF 107A via link 108A. The instruction that is contained in the SIP message that contains the SDP answer, has the effect that the SGC 106A constructs a "session identifier" and transfers the session identifier to the BGF 107A. The BGF 107A transfers the session identifier periodically in an RTCP session identifier of the RTP stream passing through the BGF 107A, in the direction towards the BGF 107B associated with the called party UE 100B via the IP transport network 111.

The RTP media transfer session stream that is routed from the BGF 107A into the direction of the called party UE 100B, is augmented with the RTCP session identifier, acting as "signature" for the session provided by the RTP stream, hereafter listed as "session signature". Due to the presence of this session signature, the user plane can take an optimized route e.g. through the IP transport network 111. In fact, this method of "signing" the user plane, represented by an RTP stream, may be applied also in cases where the user plane remains within the operator's own network. With "operator", the Home Public Land Mobile Network, HPLMN, operator of the served subscriber of called party UE 100A is meant.

A result of applying the proposed method in the operators own network, is that the operator is enabled to keep track of which applications are using the operator's IP infrastructure.

Whilst the IP infrastructure for media transfer session of an operator is used for that operator's own subscribers, the IP infrastructure such as IP transport network 111 may be used by subscribers of other operators as well.

Figure 3A:
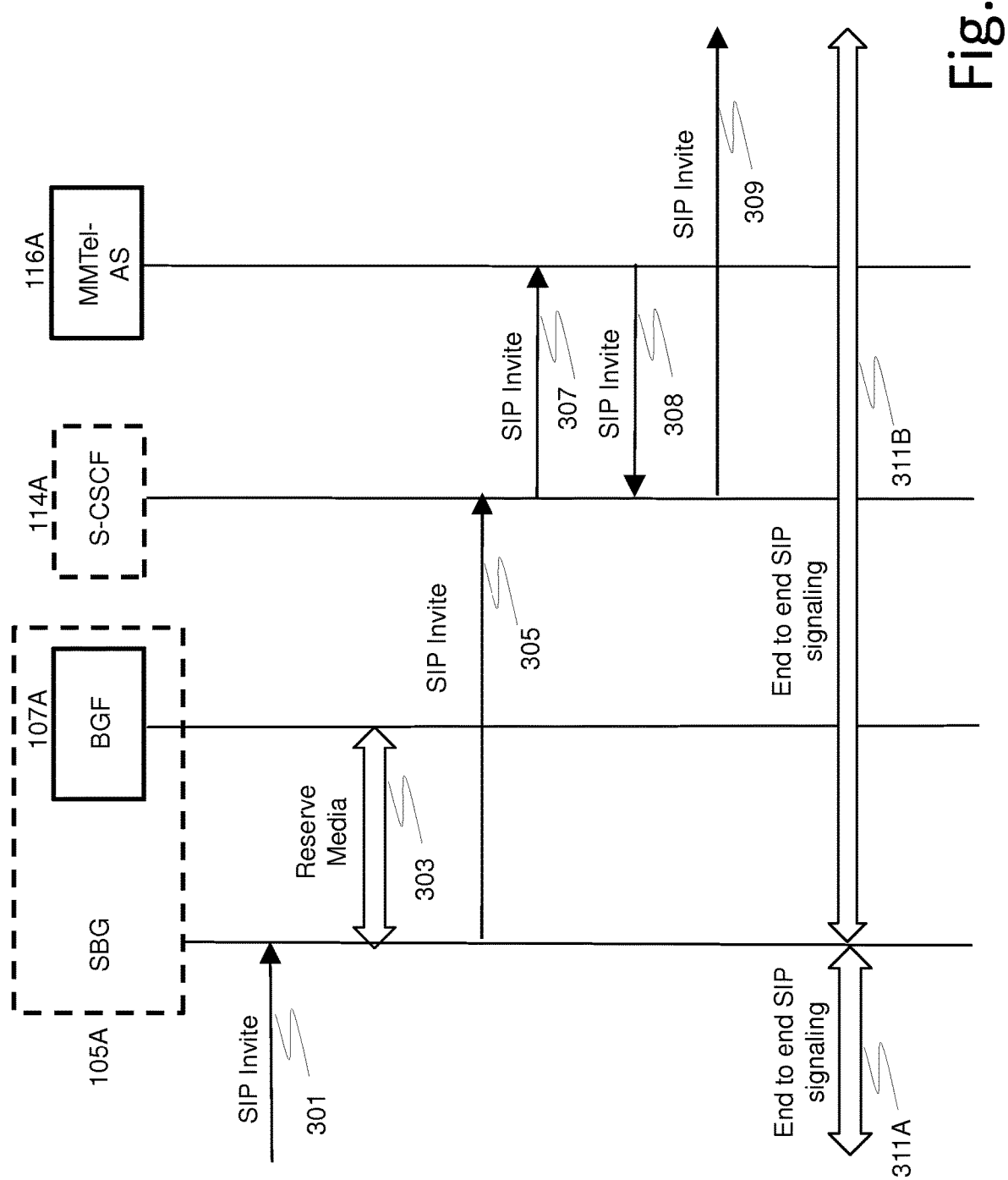
FIG. 3A is schematically presenting a signalling diagram.

FIG. 3A is schematically presenting a signalling diagram of an initiation of a call set-up procedure according to the solution as presented. It is assumed that the subscriber associated with the calling party UE 100A is provisioned in the subscriber database HSS-A 115A and the subscriber associated with the called party UE 100B is provisioned in the subscriber database HSS-B 115B respectively.

When a UE, 100A, 100B registers in an respective IMS network 114A, 114B, subscription information gets transferred from the respective HSS 115A, 115B to the respective IMS node Serving-Call Session Control Function, S-CSCF, where a sub-set of these subscription elements is transferred from the respective S-CSCF to the respective SBG 105A, 105B. Examples of such elements are e.g.:

The calling party UE 100A identity (URI, MSISDN) for whom this call is established;

The home network of the calling party UE 100A, and

SIP session identifiers such as Call-id, From tag, To tag.

Figure 3B:
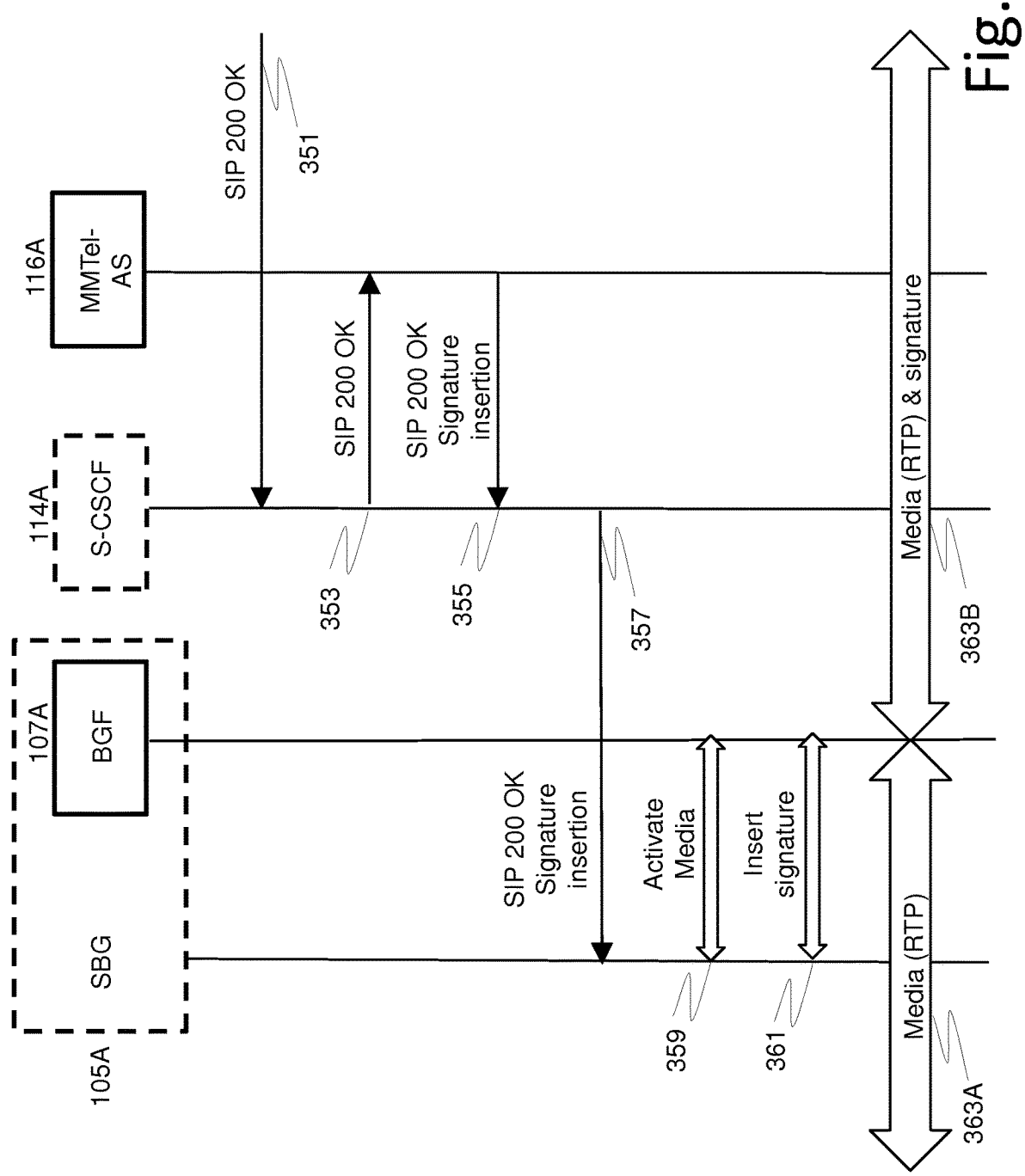
FIG. 3B is schematically presenting a further signalling diagram.

The solution proposes that the IMS service profile, contained as non-transparent data in HSS 115A, 115B, is enhanced with an identifier, implemented by an subscription element "session signature" for the user plane. This subscription element is transferred from the HSS 115A, 115B to the respective S-CSCF, and as well as from the S-CSCF to the respective SBG 105A, 105B. In FIGS. 3A and 3B the S-CSCF associated with the calling party UE 100A, is referenced with reference sign 114A, as to indicate that this entity is comprised by the IMS network 114A.

As an example the further procedure is explained for a situation wherein calling party UE 100A is calling, although the procedure can also be applied mutatis mutandis where UE 100A is called, UE 100B is called or is calling. The transfer of the "session signature" subscription element occurs within the existing procedures and message exchange. More specifically:

The subscription element is carried as an Attribute Value Pair, AVP, in the Server Assignment Answer, SAA, Diameter message from the HSS 115A to the S-CSCF; and The subscription element is further carried as a SIP header in the 200 Ok [SIP Register message] from the S-CSCF towards the SBG 105A.

By the procedure steps listed above the SBG 105A is informed that RTP sessions from the calling party UE 100A should be augmented with a session signature.

Insertion of a session signature in the user plane RTP stream might be controlled per call session for the calling- or called party UE 100A, 100B. Insertion of a session signature is not always required, depending on the actual call establishment or e.g. on the flow of the user plane RTP stream for that call. The route that will be followed by the user plane is determined during call establishment.

In FIGS. 3A and 3B, the SBG 105 is presented such that it comprises the BGF 107A, indicating that it controls the BGF by means of its comprised SGC 105A.

Call setup establishment follows standard procedures, including an end-to-end SIP Invite transaction 301, 305, 307, 308, 309 and resource reservation 303 for the calling party UE 100A towards the called party UE 100B. After the SIP Invite transaction in the direction of the called party UE 100B, the End-to end signalling 311A and 311B is performed such as signalling related to resource reservation, (early) dialogue establishment and alerting.

FIG. 3B is schematically presenting a further signalling diagram of the remainder of the call set-up, depicted in FIG. 3A.

When the 200 Ok [SIP Invite message] 351 is received from the direction of the called party UE 100B, the S-CSCF 114A of the IMS network associated with the calling party, informs 353 the MMTel-AS 116A associated with the calling party UE 100A that the call setup is answered by the called party UE 100B.

Subsequently the MMTel-AS 116A, associated with the calling party UE 100A, signals 355, 357 via the S-CSCF 114, the SBG 105A, to instruct the BGF 107A to insert a session signature into the media transfer plane via the S-CSCF, on the condition whether the "user plane session signature" subscription element has been provided for the current call/session.

Inserting the session signature may also be interpreted as injecting in—or adding the session signature to—the RTP stream in the form of e.g. RTCP.

The insertion instruction takes the form of a designated SIP header or a designated tag in an existing SIP header. An example of the latter tag is "Require: insert-session-signature". The inclusion of the tag "Require: insert-session-signature" in the SIP signaling 359 towards the SBG 105A is subject to the condition that the Invite request 359, from the SBG 105A, includes "Supported: insert-session-signature".

Instead of "insert-session-signature" an equivalent of "inject-session-signature" can also be applied.

The SGC 106A signals 361 to the BGF 107A, in response to receiving "Require: insert-session-signature" from the MMTel-AS 116A, that the BGF 107A inserts the session signature into the RTP media transfer session stream on the user plane. This instruction from SGC 106A towards the BGF 107A inserts the actual session signature that shall be used for this RTP media transfer session stream. The RTP media transfer session stream will for the current session on the user plane be enhanced with the session signature, for the media transfer session towards the network. The BGF 107B, associated with the called party UE 100B, preferably filters out the session signature RTCP messages, before providing the RTP stream to the called party UE 100B.

When media transfer session is initialized, there will be a media transfer session stream 363A without a session signature between the calling party UE 100A and the SDB 107A, as well as a media transfer session stream with a session signature 363B from SBG 107A through the IP transport network 111.

It is proposed that the session signature is transported in an RTCP packet of type "APP" (Packet type=Application-Defined RTCP Packets). However, in accordance with IETF recommendation, a dedicated Packet Type shall be defined when the method of the presented here is put into commercial operation.

Below, the format of the RTCP APP Packet is shown.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| subtype | PT=APP=204   | length                         |
+-+-+-+-+-+-+-+-+-+-+-+-+-+-+-+-+-+-+-+-+-+-+-+-+-+-+-+-+-+-+-+-+
| SSRC/CSRC                                                     |
+-+-+-+-+-+-+-+-+-+-+-+-+-+-+-+-+-+-+-+-+-+-+-+-+-+-+-+-+-+-+-+-+
| name (ASCII)                                                  |
+-+-+-+-+-+-+-+-+-+-+-+-+-+-+-+-+-+-+-+-+-+-+-+-+-+-+-+-+-+-+-+-+
| application-dependent data                                ... |
+-+-+-+-+-+-+-+-+-+-+-+-+-+-+-+-+-+-+-+-+-+-+-+-+-+-+-+-+-+-+-+-+
```

Description of the Abbreviations Applied:

| | |
|---|---|
| V | Version. Identifies the version of RTP. The version used for an RTCP stream shall be the same as the version of the corresponding RTP stream. IETF defines that it shall be set to 2. |
| P | Padding. For some encryption algorithms, it is needed that the RTCP packet has certain length. The Padding bit is used to indicate that a number of "padding octets" are appended to the RTCP packet, in order to obtain the required RTCP packet length. |
| Subtype | Five-octet field, which may be defined by the application. The following usage of this field is proposed:<br>0 Calling party's session signature<br>1 Called party's session signature<br>2-31 Undefined |
| PT | Packet Type. Shall have value 204 (PT = APP). |
| Length | The length (nr. of 32-bit words) of this RTCP packet, including the header and any padding, decreased by 1. |
| SSRC | Source of a stream of RTP packets, as defined for RTP. |
| CSRC | Contributing source, as defined for RTP. |
| Name | Name for the Application RTCP packet. It identifies the usage of this RTCP packet type; it shall have value "session signature". |
| Data | Application-dependent data. It shall comprise the actual session signature. It shall be a BER-encoding (Basic Encoding Rules) of a data structure that comprises the following fields: |

```
SIPSessionSignature ::= SEQUENCE {
    FromTag    [0]    IA5String
                      (SIZE(minFromTagLength..maxFromTagLength,
```

```
        ToTag        [1]  IA5String
                          (SIZE(minToTagLength..maxToTagLength)),
        Call-Id      [2]  IA5String
                          (SIZE(minCallIdLength.. maxCallIdLength)),
        PAI          [3]  IA5String
                          (SIZE(minPAILength.. maxPAILength)),
        Sequence     [4]  Integer(0..65535)
}
minFromTagLength                              ::= 1
maxFromTagLength                              ::= 1024
minToTagLength                                ::= 1
maxToTagLength                                ::= 1024
minCallIdTagLength                            ::= 1
maxCallIdTagLength                            ::= 1024
minPAILength                                  ::= 1
maxPAITagLength                               ::= 1024
```

Reason to propose the content of the session signature as presented is:

The combination of From Tag, To Tag and Call-Id uniquely identifies a SIP session, as well as individual dialogues within a SIP session when that SIP session is not yet confirmed.

The P-asserted-id (PAI) identifies both the operator (domain part of the PAI) and the served subscriber (user part of the PAI).

The Sequence parameter constitutes a sequential number of the session signature message. If the session signature is transferred in an RTCP message once every 30 s, then a max. sequence value of 65535 (216-1) represents a time span of >546 hours. This is deemed sufficient. However, a larger range may be chosen for the Sequence, e.g. 0 . . . 4294967295 (232-1). Each of these parameters may be marked as OPTIONAL in the ASN.1 definition.

The session signature may be inserted only once or multiple times, as to enable a provider of the IP transport network 111 to detect more than once which party/operator is generating an RTP packet stream through the IP transport network. As an example the session signature is inserted at periodic intervals, e.g. once every 5 s. the frequency of session signature insertion may be signaled through a qualifier in the SIP Require header, e.g.:

Require: Insert-Session-Signature (30)

The parameter "(30)" indicates that the session signature shall be inserted as RTCP packets in the RTP stream once every 30 s. Inserting more than once enables an operator to define whether a particular stream is still applying the operator's IP transport network as a media transfer session stream may follow different media transfer session routing paths, during its life span. A change in IP infrastructure, e.g. updating of a routing table in an OSPF router, may have the effect that an RTP stream starts following a different route. Through the periodic inclusion of the session signature in the RTP stream, the RTP stream can be identified persistently, even when the route of the RTP stream is not consistent over time.

Figure 4:
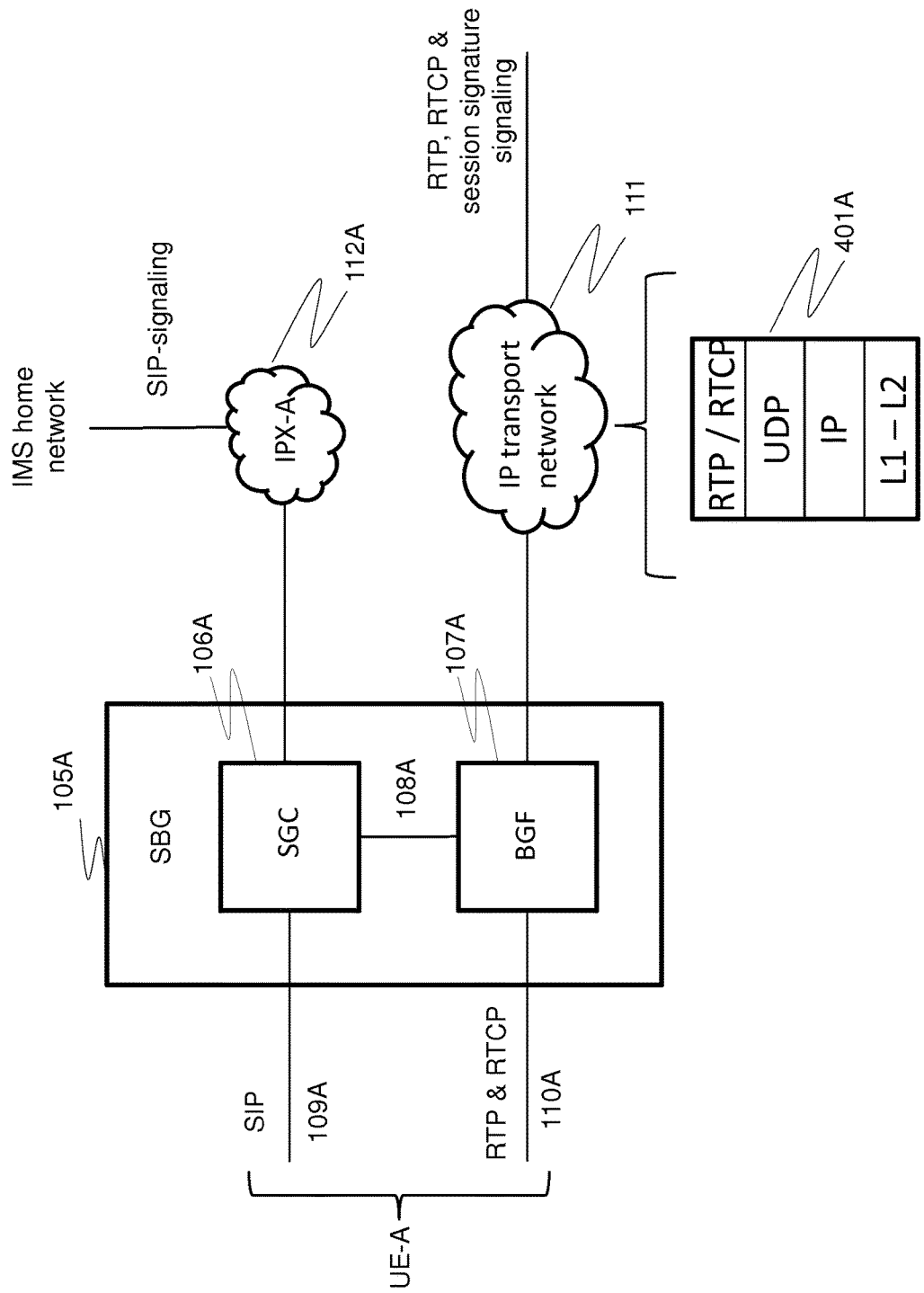
FIG. 4 is schematically presenting a further detail of FIG. 1.

FIG. 4 is schematically further detailing an embodiment of the system of FIG. 1. FIG. 4 shows how a media transfer session stream may be identified at the border of the IP interconnect network 111.

When the operator of the IP infrastructure 111, that is transporting the RTP media transfer session stream, needs to be aware of the origin of the stream, the operator is enabled by the RTCP messages containing the session signature to detect the origin of said stream. It is assumed that at the beginning of an RTP stream, there will be an RTCP message carrying the session signature. From the stack 401 of the RTCP packets traversing the IP transport network, the upper layer will reveal the RTCP information for determining the session signature, as to detect the source of the packet. An SDN controller (or SDN application functionally connected to the SDN controller) in the IP transport network 111 determines from the session signature the origin of the accompanying RTP stream and may define whether or not this stream is allowed to traverse the IP transport network. Additionally statistics on said streams can be deployed by detection of the session signature.

The insertion of the session signature is described above through a SIP header, Require: insert-session-signature. For example, the SDP answer that is returned towards the SBG 105A, during SIP session establishment, may include the Require header with the insert-session-signature tag. This SIP header would be inserted by the MMTel-AS 116A associated with the calling party UE 100A. The SDP offer that is sent towards the called party UE 100B may equally include the Require header with the insert-session-signature tag; that header would be inserted by the MMTel-AS 116B associated with the called party UE 100B.

It is common for VoLTE terminals to apply precondition signaling. There will in that case be two SDP offer-answer exchange sessions; the second SDP offer-answer results from end-to-end SIP session establishment and reflects the reservation of the access network resources that are needed for the media transfer session of the negotiated SDP.

In line with the principle of resource reservation and precondition signaling, for reflecting the resource situation in the SDP, the session signature insertion may also be reflected in the SDP. In other words, the SDP answer that is received by the SBG 105A from the MMTel-AS 116A may include an attribute per media transfer session stream, that indicates that for this media transfer session stream a session signature shall be inserted. An example is shown here below.

Session Description Protocol Version (v): 0
   Owner/Creator, Session Id (o): −670440233 2054234882 IN IP4 172.16.11.180
   Session Name (s): —
   Connection Information (c): IN IP4 172.16.150.222
   Time Description, active time (t): 0 0
   Session Attribute (a): sendrecv
   Media Description, name and address (m): audio 34880 RTP/AVP 100 105
   Connection Information (c): IN IP4 172.16.150.222
   Bandwidth Information (b): AS:41
   Media Attribute (a): curr:qos remote sendrecv
   Media Attribute (a): curr:qos local sendrecv
   Media Attribute (a): des:qos mandatory remote sendrecv
   Media Attribute (a): des:qos mandatory local sendrecv
   Media Attribute (a): sendrecv
   Media Attribute (a): rtpmap: 100 AMR-WB/16000
   Media Attribute (a): rtpmap:105 telephone-event/16000

Media Attribute (a): fmtp: 100 max-red=0; mode-change-capability=2
Media Attribute (a): fmtp:105 0-15
Media Attribute (a): ptime:20
Media Attribute (a): maxptime: 40
Media attribute (a): insert-session-signature(30)

The attribute insert-session-signature(30) indicates that the session signature shall be inserted every 30 s for this media transfer session stream. For a call that comprises an audio stream and a video stream, there will be two separate media transfer session stream definitions in the SDP. Each media transfer session stream definition may then have an attribute to indicate that a session signature shall be inserted in RTCP for that media transfer session stream. The SBG 105A is, by design, acting as Back to Back User Agent, B2BUA. Hence, the SBG 105A can remove the insert-session-signature attribute from the SDP, prior to forwarding the SDP towards the calling party UE 100A.

If during a call the routing of the RTP stream changes resulting in that the session signature insertion is no longer required, or when the session signature insertion is no longer required for other reason, the MMTel-AS 116A may initiate SDP re-negotiation, for the purpose of removing the insert-session-signature attribute from the SDP.

As a further enhancement, the actual session signature to insert in the RTP stream may be provided by MMTel-AS, as opposed to having the SBG/SGC 105A, 106A construct or compose the session signature. This may be done as follows:
Media attribute (a): insert-session-signature; freq=30; realm=ims.mnc302.mcc270.3gppnetwork.org; signature=akjsgf23490askdjl^%$sdflg The fields of this attribute have the following meaning:
freq This field indicates how often the session signature shall be inserted, measured in seconds. In this example every 30 s.
realm This field contains the domain name of the serving operator, i.e. the operator under whose control (under whose auspices) the media transfer session stream is established.
signature The actual session signature to be inserted. The session signature is transparent for the SBG 105A; the SBG 105A inserts the session signature as received, without analyzing the session signature. The MMTel-AS 116A may construct the session signature through a combination of Call-Id, From tag and To tag (as used in the SIP session on the access side of MMTel-AS 116A). However, any scheme may be devised by the MMTel-AS 116A to construct a SIP session signature per SIP session.

Realm and Signature would in that case be transferred as separate parameters in the above-described RTCP header. The session signature that is carried in an RTCP header would then have the following ASN.1 definition:

```
SIPSessionSignature ::= SEQUENCE {
    Realm      [0] IA5String
                   (SIZE(minRealmLength..maxRealmLength)),
    Signature  [1] IA5String
                   (SIZE(minSignatureLength..maxSignatureLength
                   ))                                 OPTIONAL,
    Sequence   [4] Integer(0..65535)
}
minRealmLength                  ::= 1
maxRealmLength                  ::= 1024
minSignatureLength              ::= 1
maxSignatureLength              ::= 1024
```

An entity in the IP transport network 111 that transports/forwards the RTP stream can read the Realm field of an RTCP packet of the designated session signature application type and ascertain that the operator sourcing the stream is entitled to transfer a media transfer session through the IP transport network 111. The Signature field may be used for additional verification. This parameter is marked as OPTIONAL in ASN.1. The MMTel-AS 116A would include this parameter only when required. When the SIP session needs to be signed with the operator realm only, then the inject-session-signature attribute in the SDP would be as follows:
Media attribute (a): inject-session-signature; freq=30; realm=ims.mnc302.mcc270.3gppnetwork. org The present solution relates to communication networks that are built according to architecture as specified for the IMS network. Whilst the solution is described with reference to IMS as preferred embodiment, IMS is not the only class of network in which the solution may be applied. Other networks that are composed of functional entities with similar functions as found in IMS, may also be candidate networks in which the present solution can be applied.

With the method presented, an operator of an interconnect network that facilitates the routing of a media transfer session stream, can identify the owner, creator or origin of that RTP media transfer session stream through inspection of that RTP media stream. There is, for this purpose, no need to have access to the control plane; the user plane provides the necessary information.

Hence, the user plane can be routed optimally, without the necessity to let the control plane follow the same path as the user plane, and still enabling the capability to associate that user plane with the operators under whose control that session was established.

Advantages achieved by the suggested solution are:
Improved possibility of optimizing the routing of the user plane for an IMS based communication session; this translates into:
  reduced media transfer transmission cost;
  reduced media transfer latency (due to shorter route);
  reduced overall communication session complexity (since the media traverses fewer nodes).
Improved possibility of optimizing the routing of the control plane for an IMS based communication session, as this routing is not necessarily to be performed jointly with the user plane; this translates into:
  equipment cost saving (reduced load on various SIP proxies);
  reduced call set up time (due to fewer SIP proxies to traverse);
  reduced overall communication session complexity (due to fewer SIP proxies to traverse, e.g. no TRF needed).
In case the embodiment is selected wherein the MMtel-AS composes the session signature to be inserted by the BGF 107A, there are additional advantages in that:
There is a reduced complexity for the SBG/SGC 105A, 106A; the SBG/SGC 105A, 106A does not need to construct or compose the session signature.
Transparent means for entities in the IP transport network 111 for a media transfer session, for extracting the serving operator realm from the RTP stream (RTCP session signature message).
The session signature can be shorter. MMTel-AS provides a session signature that contains the required information, but not more than that. The session signature may be omitted when it is not required.

Figure 5:
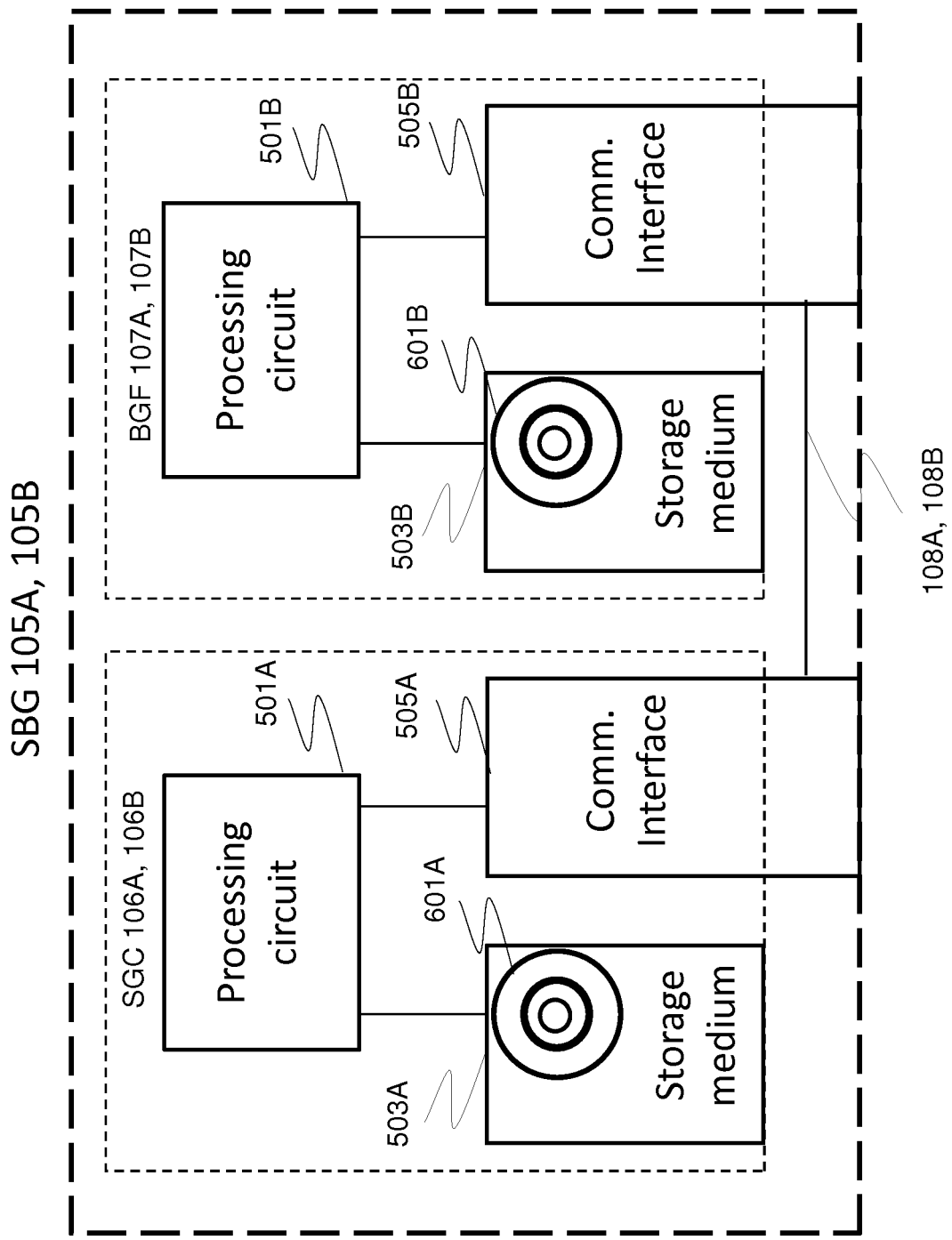
FIG. 5 is a schematic diagram showing a functional entity according to an embodiment.

FIG. 5 is a schematic diagram showing an embodiment presenting in a number of functional units, the components of the gateway function SBG 105A, 105B. The SBG 105A, 105B is in the description above regarded as a single unit, such that instructions how to handle the user plane are received via the control plane, and executed for the user plane. Implementation of the functions of the SBG is performed by logical units SGC 106A, 106B for the control plane and BGF 107A, 107B for the user plane. The SGC and BGF logical units do not have to reside at the same location. When the text above reads that the SBG 105A, 105B is arranged to perform certain steps, it should be understood that these actions are implemented on the SGC and BGF for the control plane and user plane respectively.

Processing circuitry 501A, 501B is provided using one or more suitable central processing unit (CPU), multiprocessor, microcontroller, digital signal processor (DSP), etc., capable of executing software instructions stored in a computer program product 601A, 601B (depicted in FIG. 6), e.g. in the form of a storage medium 503A, 503B. The processing circuitry 501A, 501B may further be provided as e.g. a suitable computer processing unit, or a distributed cloud of computing facilities.

The processing unit 501A, 501B is configured to cause the gateway function (105A) to:

receive an identifier associated with a call session of the calling party UE 100A, the identifier identifying insertion of a session signature in the media transfer session;

use the identifier for composing the session signature, and insert the session signature in the media transfer session in the first path (111), such that an evaluation of the session signature enables associating the media transfer session with an operator sourcing the media transfer session. The first path is to be understood as the user plane between the calling and called party UE 100A, 100B.

The storage medium 503A, 503B may store the set of operations, wherein the processing circuitry 501A, 501B is configured to retrieve a set of operations from the storage medium 503A, 503B to cause the network SBG 105A, 105B to perform the set of operations. The set of operations may be provided as a set of executable instructions.

The gateway function SBG 105A, 105B may further comprise a communications interface 505A, 505B that is configured to:

Perform the communication internal to the SBG 105A, 105B, as such between the SGC 106A, 106B and the BGF 107A, 107B via link 108A, 108B respectively.

Perform communication to the PDN-Gw 104A, 104 for the transfer of control and user plane Perform communication with a.o. the IMS network 114A, 114B and the IP transport network 111.

As such the communications interface 505A, 505B may comprise one or more transmitters and receivers. The processing circuitry 501A, 501B controls the general operation of the gateway function SBG 105A, 105*b* e.g. by sending and receiving data and control signals to the communications interface 505A, 505B and the storage medium 503A, 503B.

Figure 6:
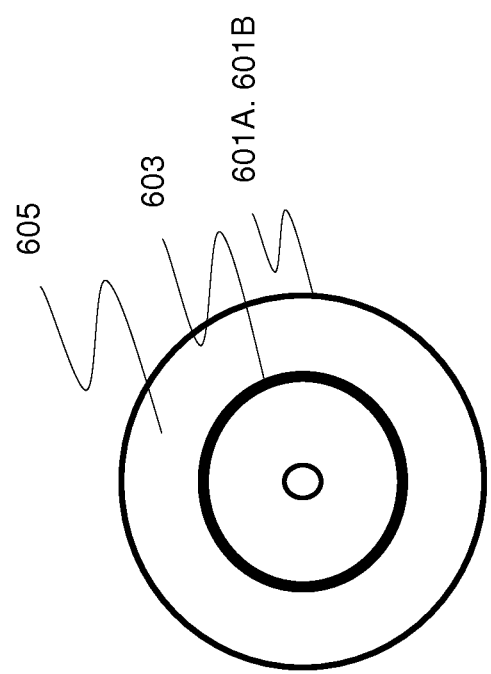
FIG. 6 is schematically illustrating an example of a computer program product comprising computer readable storage medium according to an embodiment.

FIG. 6 is schematically illustrating an example of a computer program product comprising computer readable storage medium according to an embodiment. FIG. 6 shows one example of a computer program product comprising computer readable storage medium 605. On this computer readable storage medium, a computer program 603 can be stored, which computer program can cause the processing circuitry 501A, 501B respectively and communicatively associated entities and devices, such as the communications interface 505A, 505B and the storage medium 503A, 503B are enabled to execute methods according to embodiments described.

In the example of FIG. 6, the computer program product 601A, 601B is illustrated as a disc with a surface 605 where program data may be stored. The computer program product 601A, 601B could also be embodied as a memory, such as a random access memory (RAM), a read-only memory (ROM), or as a non-volatile storage medium of a device in an external memory. The computer program 603 is here schematically shown as a track, stored on the depicted disk.

Figure 7:
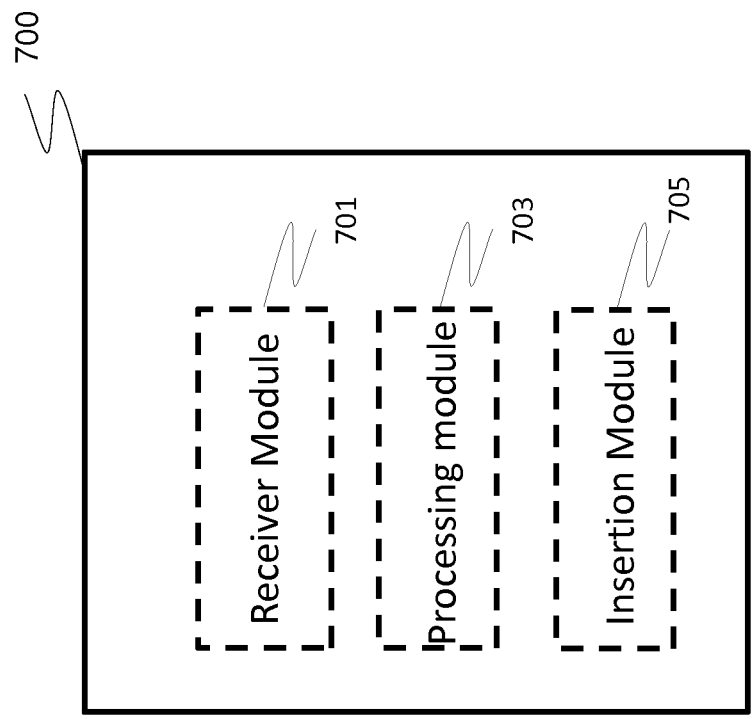
FIG. 7 is schematically illustrating an example of the functional components of a gateway function.

FIG. 7 is schematically illustrating an example of the functional components of a gateway function. The gateway function 700 is depicted with a receiver module 701 for receiving an identifier associated with a call session of the calling party UE (100A), the identifier identifying insertion of a session signature in the media transfer session;

a processing module 703 for composing the session signature, based on the identifier received, and an insertion module 705 for inserting the session signature in the media transfer session in the first path (111), such that an evaluation of the session signature enables associating the media transfer session with an operator sourcing the media transfer session.

The invention claimed is:

1. A method in an Internet Protocol, IP, Multimedia Subsystem, IMS, infrastructure for enabling associating a media transfer session with an operator sourcing the media transfer session, the infrastructure comprising, a calling party User Equipment, UE, a called party UE, and a first path arranged to transport the media transfer session between the calling party UE and the called party UE via a gateway function, during the media transfer session setup an IMS entity receiving subscriber information, the information associated with a call of the calling party UE, a method comprising:

the IMS entity providing an identifier to the gateway function, the identifier being associated with a call session of the calling party UE, the identifier identifying insertion of a session signature in the media transfer session;

the gateway function using the identifier for composing a session signature;

the gateway function inserting the composed session signature in the media transfer session in the first path, such that an evaluation of the session signature enables associating the media transfer session with the operator sourcing the media transfer session;

the session signature being inserted in a media transfer session in a second path, different from the first path, the second path being between the calling party UE and the called party UE; and the identifier associated with the call session of the calling party UE, comprising an indication that the composing step must be based on one of information available to the gateway function and information comprised by the identifier.

2. A method in a gateway function residing in an Internet Protocol, IP, Multimedia Subsystem, IMS, infrastructure, for enabling associating a media transfer session with an operator sourcing the media transfer session, the infrastructure comprising, a calling party User Equipment, UE, a called party UE, and a first path arranged to transport the media transfer session between the calling party UE and the called party UE via the gateway function, the method comprising:

receiving, from an IMS entity, an identifier associated with a call session of the calling party UE, the identifier identifying insertion of a session signature in the media transfer session;

using the identifier for composing the session signature;

inserting the session signature in the media transfer session in the first path, such that an evaluation of the session signature enables associating the media transfer session with the operator sourcing the media transfer session;

the session signature being inserted in a media transfer session in a second path, different from the first path, the second path being between the calling party UE and the called party UE; and the identifier associated with the call session of the calling party UE, comprising an indication that the composing step must be based on one of information available to the gateway function and information comprised by the identifier.

3. The method according to claim 2, wherein the inserted session signature comprises at least one of: an address of a Home network operator of the calling party UE and a SIP session identifier.

4. The method according to claim 2, wherein the inserting step is one of:

repeated a number of predetermined times;

repeated during a predetermined period; and the session signature is inserted on request of an entity comprised by the IMS network.

5. The method according to claim 2, wherein the session signature applies one of a Real-time Transport Control, RTCP, and a secure RTCP, SRTCP protocol.

6. The method according to claim 2, wherein a Subscriber database entity associated with the calling party UE comprises an attribute, indicating that the session signature shall be inserted in one of the first path and the second path.

7. The method according to claim 3, wherein the inserting step is one of:

repeated a number of predetermined times;

repeated during a predetermined period; and the session signature is inserted on request of an entity comprised by the IMS network.

8. The method according to claim 3, wherein the session signature applies one of a Real-time Transport Control, RTCP, and a secure RTCP, SRTCP protocol.

9. The method according to claim 3, wherein a Subscriber database entity associated with the calling party UE comprises an attribute, indicating that the session signature shall be inserted in one of the first path and the second path.

10. A gateway function residing in an Internet Protocol, IP, Multimedia Subsystem, IMS infrastructure, for enabling associating a media transfer session with an operator sourcing the media transfer session, the infrastructure comprising, a calling party User Equipment, UE, a called party UE, and a first path arranged to transport the media transfer session between the calling party UE and the called party U via the gateway function, the gateway function comprising a processing unit, the processing unit being configured to cause the gateway function to:

receive, from an IMS entity, an identifier associated with a call session of the calling party UE, the identifier identifying insertion of a session signature in the media transfer session;

use the identifier for composing the session signature;

insert the session signature in the media transfer session in the first path, such that an evaluation of the session signature enables associating the media transfer session with the operator sourcing the media transfer session;

insert the session signature in a media transfer session in a second path, different from the first path, the second path being between the calling party UE and the called party UE; and the identifier associated with the call session of the calling party UE, comprising an indication that the composing of the session signature must be based on one of information available to the gateway function and information comprised by the identifier.

11. The gateway function according to claim 10, wherein the processing unit is configured to one of:

insert the session signature repeatedly a number of predetermined times;

repeatedly insert the session signature during a predetermined period; and insert the session signature on request of an entity comprised by the IMS network.

12. The gateway function according to claim 10, wherein the processing unit is configured to apply a Real-time Transport Control, RTCP, or secure RTCP, SRTCP protocol for the inserted session signature.

13. The gateway function according to claim 10, wherein the processing unit is configured decide on an indication received to one of:

compose the session signature based on information available to the gateway function; and compose the session signature on information comprised by the indication.

14. A computer non-transitory storage medium storing a computer program for enabling associating a media transfer session with an operator sourcing the media transfer session, the infrastructure enabling control of media transfer session in an IMS network infrastructure, the infrastructure comprising a gateway function, a calling party UE, a called party UE, a Subscriber database entity comprising subscription data associated with the calling party UE, and a first path arranged to transport media transfer messages between the calling party UE and the called party UE the computer program comprising computer code which, when run on processing circuitry of the gateway function causes the gateway function to:

receive, from an IMS entity, an identifier associated with a call session of the calling party UE, the identifier identifying insertion of a session signature in the media transfer session;

use the identifier for composing the session signature;

insert the session signature in the media transfer session in the first path, such that an evaluation of the session signature enables associating the media transfer session with the operator sourcing the media transfer session;

the session signature being inserted in a media transfer session in a second path, different from the first path, the second path being between the calling party UE and the called party UE; and the identifier associated with the call session of the calling party UE, comprising an indication that the composing of the session signature must be based on one of information available to the gateway function and information comprised by the identifier.

* * * * *